(12) United States Patent
Kim et al.

(10) Patent No.: US 8,718,102 B2
(45) Date of Patent: May 6, 2014

(54) MINIMALISTIC LTE MAINTENANCE TIMING ADVANCE METHOD

(75) Inventors: Yun H. Kim, Bartlett, IL (US); Christopher P. Larosa, Crysal Lake, IL (US); Bryan S. Nollett, Fox River Grove, IL (US)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 13/326,550

(22) Filed: Dec. 15, 2011

(65) Prior Publication Data
US 2013/0156018 A1 Jun. 20, 2013

(51) Int. Cl.
*H04W 56/00* (2009.01)
*H04W 28/06* (2009.01)

(52) U.S. Cl.
CPC .................. *H04W 56/0045* (2013.01)
USPC ............ 370/506; 370/516; 370/521; 455/502

(58) Field of Classification Search
USPC .............. 370/310.2, 328–339, 349, 503–521; 455/422.1, 502
See application file for complete search history.

(56) References Cited

U.S. PATENT DOCUMENTS

| | | | |
|---|---|---|---|
| 6,813,325 B1 * | 11/2004 | Lin ................................. | 375/354 |
| 7,751,448 B2 | 7/2010 | Laroia et al. | |
| 2002/0126706 A1 * | 9/2002 | Laroia et al. ................... | 370/503 |
| 2003/0123490 A1 * | 7/2003 | Kaku et al. ..................... | 370/503 |
| 2004/0100897 A1 * | 5/2004 | Shattil ............................. | 370/206 |
| 2006/0222087 A1 * | 10/2006 | Bauman et al. ............... | 375/259 |
| 2011/0044188 A1 | 2/2011 | Luo et al. | |
| 2012/0226827 A1 * | 9/2012 | Raju et al. ........................ | 710/5 |

FOREIGN PATENT DOCUMENTS

| | | |
|---|---|---|
| EP | 2079267 A2 | 7/2009 |
| WO | 2009046009 A2 | 4/2009 |

OTHER PUBLICATIONS

Patent Cooperation Treaty, International Search Report and Written Opinion of the International Searching Authority for International Application No. PCT/US2012/067835, Feb. 26, 2013, 11 pages.

* cited by examiner

*Primary Examiner* — Hoon J Chung
(74) *Attorney, Agent, or Firm* — Schwabe, Williamson & Wyatt, P.C.

(57) ABSTRACT

A method that implements a timing advance for an uplink communication from a user equipment (UE) comprises: selecting at least one subframe; reducing a duration of at least one selected symbol of each of the at least one subframe to generate at least one reduced duration subframe; replacing a remaining portion of payload data of each of the at least one selected symbol with a pre-selected replacement value; by-passing each of the at least one selected symbol during pre-transmission processing of the at least one reduced duration subframe; processing any remaining symbols of the at least one reduced duration subframe, such that a processing time of the remaining symbols of the at least one reduced duration subframe is reduced by at least the value of the timing advance; and transmitting the at least one reduced duration subframe via the uplink communication to the base station.

20 Claims, 6 Drawing Sheets

MINIMALISTIC LTE MAINTENANCE TIMING ADVANCE METHOD

BACKGROUND

1. Technical Field

The present invention relates in general to wireless communications and in particular to timing advance in wireless communications.

2. Description of the Related Art

In a Long Term Evolution (LTE) communication system, the evolved Node B (eNB) or base station can initiate a timing advance on behalf of the network to compensate for changing distance between the user equipment (UE) and the base station. If the UE is transmitting during the timing advance command, the UE must maintain the old timing until a given subframe, and the UE must apply an instantaneous advance at the beginning of a next subframe. Fundamentally, this movement results in a loss of samples and also results in a loss of time for the UE to compute a full transmit orthogonal frequency division multiplexing (TX OFDM) symbol. The resulting loss of samples, however, does not reduce the amount of computation required for OFDM, as the UE still computes the full symbol and then drops the samples as necessary to comply with the timing advance command. In order to handle this timing advance scenario, a faster clock or duplication of hardware is commonly needed.

BRIEF DESCRIPTION OF THE DRAWINGS

The described embodiments are to be read in conjunction with the accompanying drawings, wherein.

DETAILED DESCRIPTION

Figure 1:
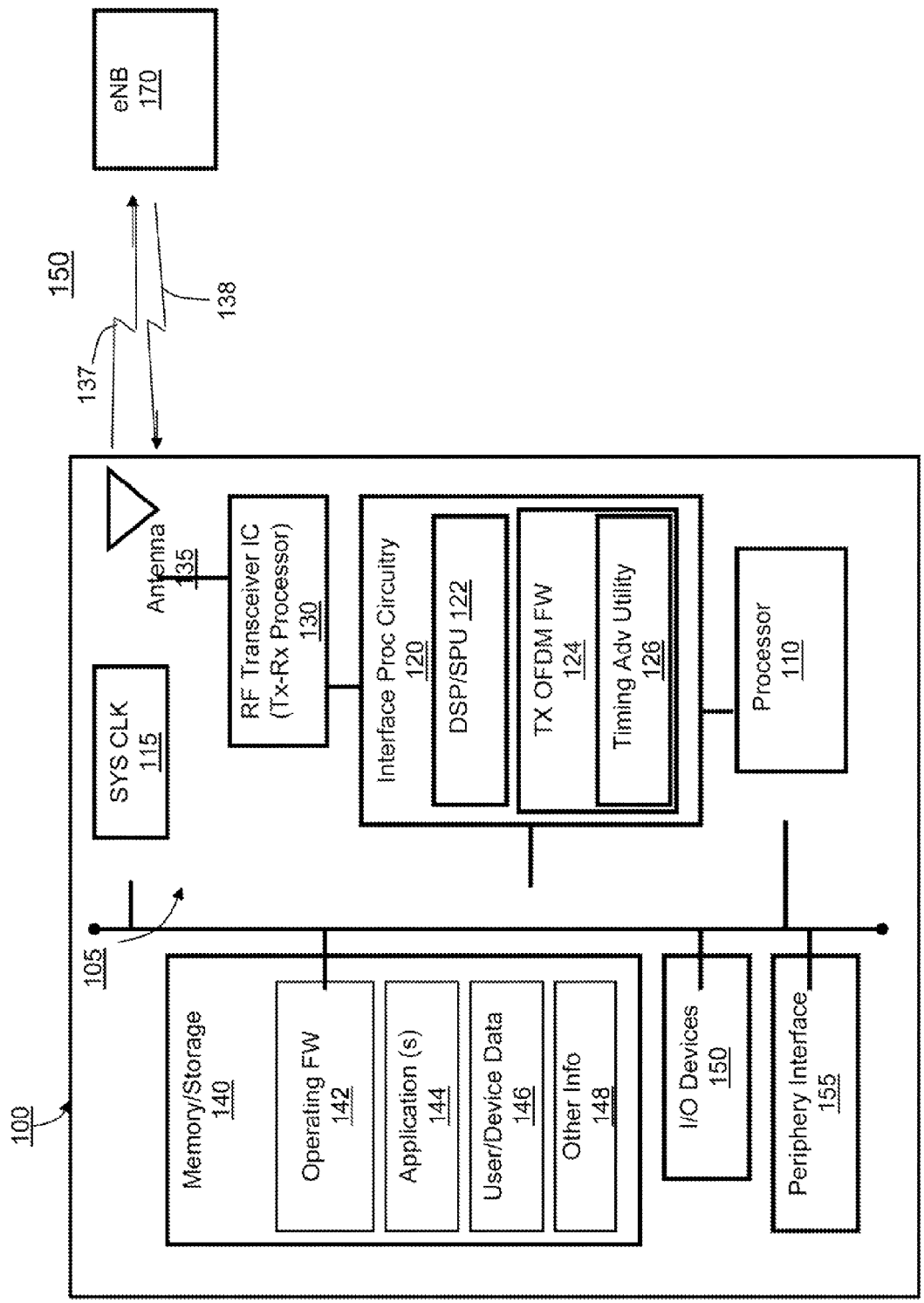
FIG. 1 is a block diagram representation of a user equipment (UE) utilized within a wireless communication network and in which features of the described embodiments can be advantageously incorporated, according to one embodiment.

The illustrative embodiments provide a method and user equipment (UE) that provides efficient implementation of a timing advance during an uplink communication between the UE and a base station within a wireless communications network. In a first embodiment, the method includes: selecting at least one subframe that is scheduled for pre-transmission processing. The method further includes: reducing a duration of the at least one subframe by a value of the timing advance to generate at least one reduced duration subframe; and replacing at least a portion of payload data in the at least one reduced duration subframe with a pre-selected replacement value. Then, the method provides withholding pre-transmission processing of the at least a portion of the subframe with payload data replaced with the pre-selected replacement value; and processing any remaining portion(s) of the at least one reduced duration subframe. As a result of the selective processing of portions of the reduced duration subframe, a processing time of the at least one reduced duration subframe is reduced by at least the value of the timing advance. Finally, the method includes transmitting the at least one reduced duration subframe via the uplink stream to the base station. In the above method, during pre-transmission processing, individualized portions (e.g., symbols) within each subframe transmitted from the UE to the base station are processed prior to being transmitted via the uplink communication.

In a second embodiment that provides a method which implements a timing advance for the uplink communication from a user equipment (UE) at the symbol level, the method includes: selecting at least one subframe made up of multiple symbols of payload data; reducing a duration of at least one selected symbol of each of the at least one subframe to generate at least one reduced duration subframe; replacing a remaining portion of payload data of each of the at least one selected symbol with a pre-selected replacement value; bypassing each of the at least one selected symbol during pre-transmission processing of the at least one reduced duration subframe; performing pre-transmission processing of any remaining symbols of the at least one reduced duration subframe, such that a processing time of the at least one reduced duration subframe is reduced by at least the value of the timing advance; and transmitting the at least one reduced duration subframe via the uplink communication to the base station.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the invention described herein is provided within processing devices and/or structures and can involve use of a combination of hardware, firmware, as well as several software-level constructs (e.g., program code and/or program instructions and/or pseudo-code) that execute to provide a specific utility for the device. The presented figures illustrate both hardware components and software and/or logic components within a wireless communication device architecture, referenced throughout the disclosure as a user equipment (UE). Certain aspects of the disclosure are applicable to a long term evolution (LTE) based wireless network and are described as occurring within an LTE based network, utilizing names and parameters that may be associated with the corresponding LTE communication protocol. However, the disclosure is not intended to be limited to implementation solely within an LTE environment, and extension of the functional features described herein to other types of networks and/or network protocols is contemplated as falling squarely within the equivalents of the disclosure.

Referring now to the figures, and specifically to FIG. 1, which provides a block diagram representation of an example user equipment (UE) within which certain of the functional aspects of the described embodiments can advantageously be implemented. Within the disclosure embodiments, UE 100 implements the various features of the described embodiments utilizing one or more of the illustrated components, singularly and/or in combination. In one embodiment, UE 100 is a mobile device, such as a cellular phone, smartphone, two-way radio communication device, laptop, netbook, tablet computer, or similar device that can (a) communicate wirelessly within a communication network and (b) be physically moved relative to a base station with which the device is in communication. As such, UE 100 can be any type of communication device that can be required to perform a timing advance during uplink communication. UE 100 is generally configured with system bus interface 105 to which is most of the physical components are communicatively coupled.

UE 100 comprises processor 110 and communication interface processing circuitry 120, which, for simplicity shall be referred to as interface circuitry 120. Processor 110, which can also be referred to as application processor 110, controls the majority of device level application processing that does not directly involve transmitting and receiving functions of signal processing. These signal processing functions of UE 100 are generally provided by interface circuitry 120, in the illustrated embodiment. Interface circuitry 120 can comprise digital signal processor (DSP) or signal processing unit (SPU) 122 as well as one or more signal processing firmware, of which transmit orthogonal frequency division multiplexing (TX OFDM) firmware 124 is illustrated. Throughout the description, DSP/SPU 122 can be referred to simply as SPU 122. Within TX OFDM firmware 124 is timing advance utility 126, which generally represents a firmware module that enables the various functional features related to the UE's efficient handling of a timing advance, as described herein. In one embodiment, timing advance utility 126 can be a firmware upgrade to an existing UE 124 having a legacy version of TX OFDM firmware 124. Thus, while shown as being implemented via a separate utility, the functionality provided by timing advance utility 126 can be provided by one or more DSP-executable codes added to existing firmware of interface processing circuitry 120. Also, as an initial note, signal processing unit 122 executes TX OFDM firmware 124 including firmware code for timing advance utility 126 and inverse Fast Fourier Transform (iFFT) functions to process individual symbols of a selected subframe, or a subframe generally, during pre-transmission processing.

Coupled to interface circuitry 120 is radio frequency (RF) transceiver integrated circuit (IC) 130. RF transceiver IC 130 shall hereinafter be simply referred to as transceiver 130. Transceiver 130 is further coupled to at least one antenna 135. Collectively, transceiver 130 and antenna 135 enables UE 100 to send and receive communication signals over an air interface 150. In most of the described embodiments, the sending and receiving functions of transceiver 130 occurs wirelessly, and the wireless communication is facilitated by the at least one antenna 135, which propagates signals forwarded from transceiver 130 to a receiving device, such as a base station, of which eNB 170 is illustrated as an example. Transmission of signals from UE 100 to eNB 170 occurs via uplink communication 137, which can also be referred to as an uplink channel. Inversely, transmission of signals from eNB 170 to UE 100 can occur via downlink communication 138 and such transmission is received at antenna 135 and forwarded to DSP 122 via transceiver 130.

Within UE 100, processor 110 and interface circuitry 120 are connected to a combined memory and storage component 140 via system bus interface 105. In some implementations of UE 100, separate memory and storage components can be provided. Memory and storage component 130 includes operating firmware 142 of UE 100, one or more applications 144, and user and/or device data 146, portions of which can, in some instances, be stored on a separate subscriber identity module (SIM). Memory and storage component 130 can also include other types of software programs and/or data, which are generally illustrated as other information 148.

UE 100 further comprises a system clock 115, which can be any one of a plurality of mechanisms by which a general clock signal of the device is provided. As known in the art, system clock 115 can be divided down and/or otherwise manipulated to provide the required clock signals for timing during basic processing and/or frequency generation during signal processing and transmission by UE 100. UE 100 also comprises one or more I/O devices 150, which can include a microphone, speaker, keypad or keyboard, touchpad, stylus, camera, touch sensors. Finally, UE 100 comprises periphery interface 155, such as a universal serial bus (USB) or high definition multimedia interface (HDMI), by which periphery devices can connect to UE 100.

Figure 2:
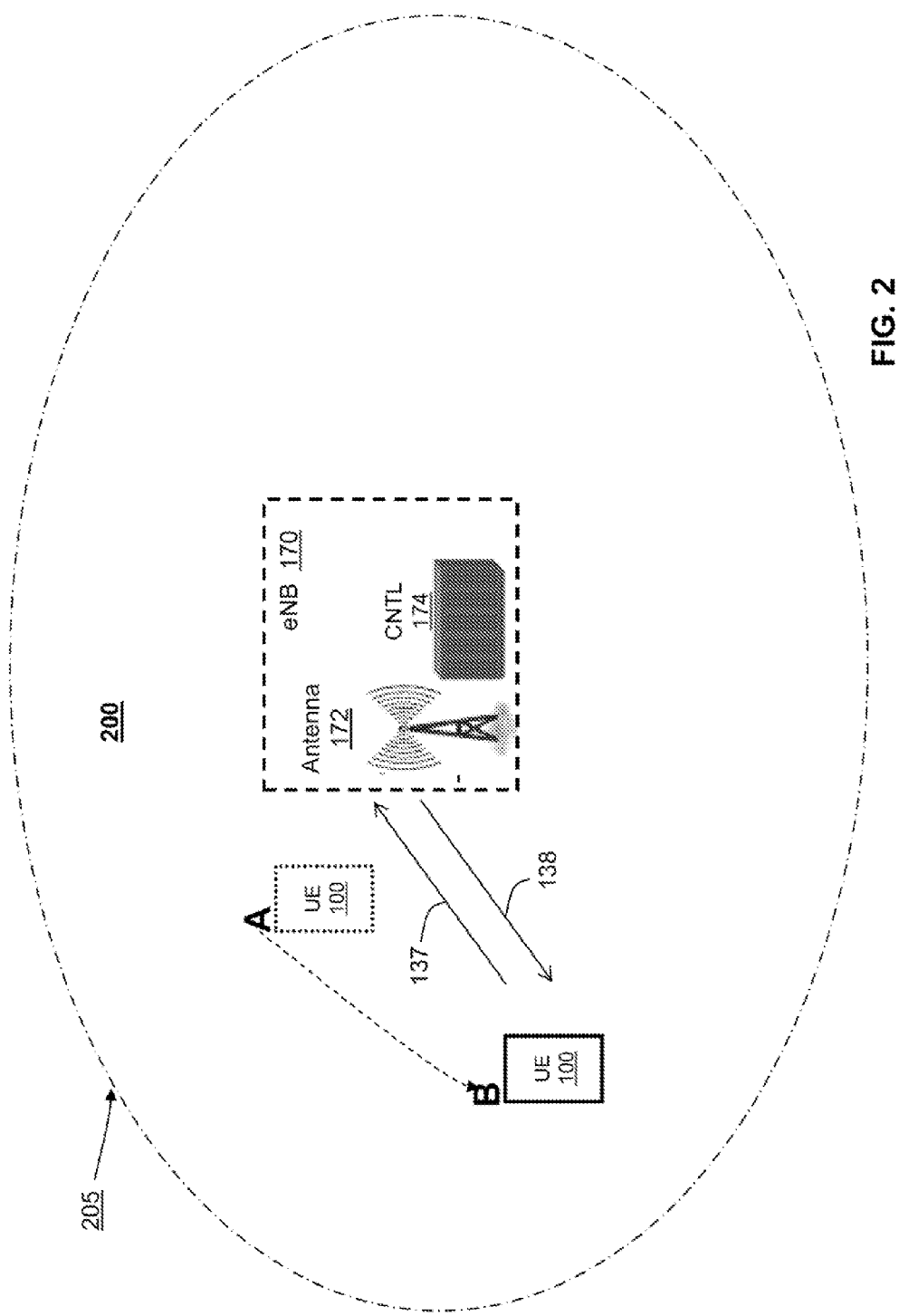
FIG. 2 provides a block diagram representation of a single cell of a wireless communication network comprising a base station and the example UE of FIG. 1, according to one embodiment.

Referring now to FIG. 2, which generally illustrates eNB 170 and UE 100 within a single cell 205 of a wireless communication network 200. As shown, eNB 170 comprises antenna 172 and controller 174. The eNB 170 is able to generate and transmit communication signals within a particular distance away from the physical location of eNB 170 and specifically from antenna 172. The radiating distance away from the antenna is illustrated by the dashed perimeter of cell 205. UE 100 is able to communicate with eNB 170 via uplink communication 137 and downlink communication 138 while UE 100 is physically located within cell 205. Those skilled in the art are familiar with the concept of hand off and appreciate that the wireless communication network 200 can comprise a large number of base stations supporting the ongoing communication of UE 100 with the network as the UE travels from one location to another within a cell and from one cell to another within the expanded wireless network.

In the example of FIG. 2, UE 100 is assumed to be moving and has been moved from location A to a location B, which is further away from eNB 170. As UE 100 travels away from eNB 170, the time required for transmitted subframes to propagate over the uplink communication 137 between UE 100 and eNB 170 increases, which can result in late arrival of transmitted subframes and resulting degradation of the signal. Thus, to compensate for the additional propagation time, signal processing unit 122 of UE 100 can implement a timing advance on the uplink communication 137. It is appreciated that the trigger for such a timing advance operation can be based on locally detected conditions, as well as in response to a timing advance request from eNB 170. It is further appreciated that the trigger for a timing advance can be independent of any propagation time delays experienced on the uplink communication due to movement of UE 100, and this movement-based scenario is provided solely as one example of a possible trigger. For example, in LTE, when UE 100 wishes to establish a radio resource control (RRC) connection with eNB 170, UE 100 transmits a Random Access Preamble, and eNB 170 estimates the transmission timing of the terminal based on this preamble. The eNB 170 then transmits a Random Access Response, which consists of a timing advance command. UE 100 can then adjust the UE's terminal transmit timing based on the timing advance indicated in the received timing advance command. Regardless of what triggers the timing advance, once UE 100 and particularly signal processing unit 122 of UE 100 initiates a timing advance for the uplink communication 137, execution of timing advance utility 126 provides a method by which UE 100 performs the maintenance timing advance without requiring additional hardware or a faster clock to compensate for the reduction in available symbol processing time.

Figure 3:
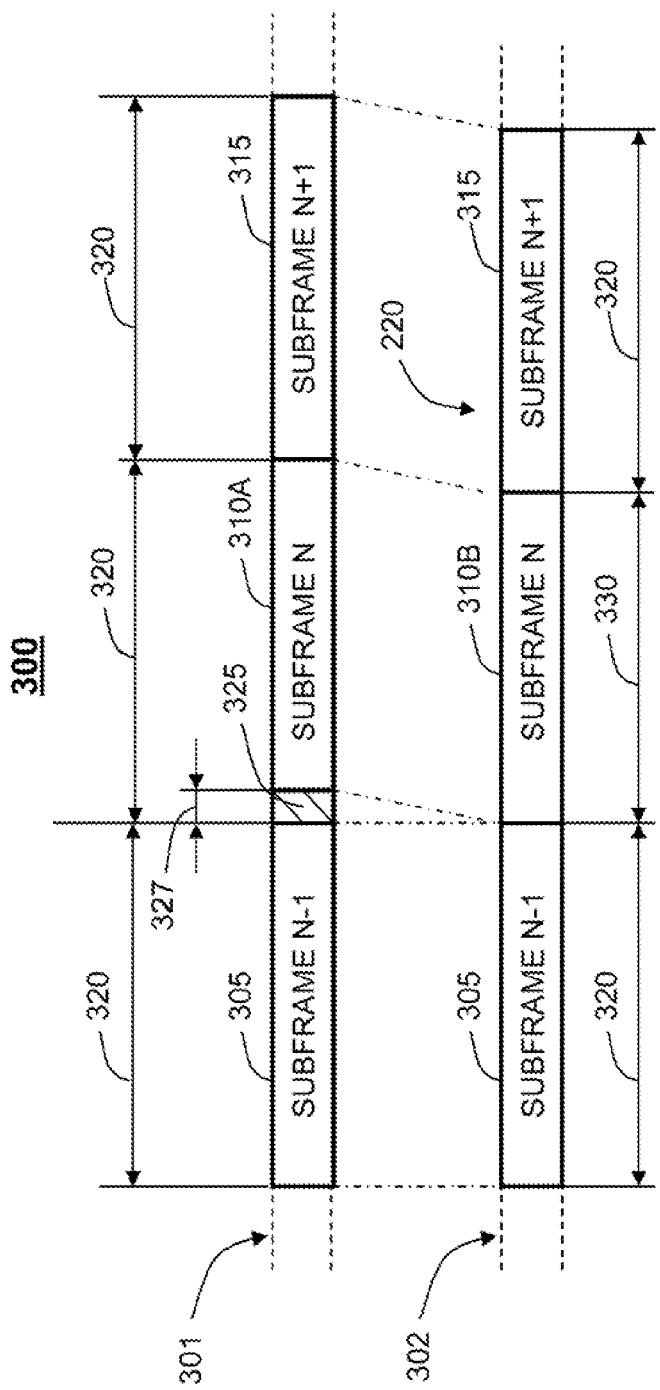
FIG. 3 illustrates a sequence of transmission subframes being processed by a UE while implementing a timing advance affecting at least one subframe, according to one or more embodiments.

To better describe the handling by UE 100 of a maintenance timing advance, according to the present disclosure, reference is made to FIG. 3, which illustrates an upper sequence 301 and a lower, time-advanced, sequence 302 of three sequential subframes 300 being processed for transmission by signal processing unit 122 of UE 100, while implementing a timing advance that affects at least one subframe. In each sequence (301, 302), three sequential subframes are illustrated, namely subframe N−1 305, subframe N 310, and subframe N+1 315. Subframe N 310 is specifically identified as being of normal "size and duration" subframe N 310A in the upper sequence 301 and reduced size and duration subframe N 310B in the lower sequence 302. As a specific example, in the LTE protocol, the normal size and duration subframe is 1 millisecond (ms), and thus the reduced size and duration subframe would be less than 1 ms. The terms size and duration are intended to convey that the actual physical size of the subframe as well as the time required to process the particular size of the subframe are substantially correlated, when pre-transmission processing is performed on the respective subframe N. In lower sequence 302, normal subframe N 310A has been truncated to provide reduced size and duration subframe N 310B to allow for the timing advance. For simplicity, the subframe will generally be referenced as subframe N 310, with specific use of the A and B designations presented only when referencing a particular one of the two sequences. Subframe N 310 is the middle subframe and represents the subframe at which the timing advance is implemented.

The upper sequence 301 represents a first time, t1, during which SPU 122 selects subframe N 310A to be the subframe at which a timing advance is performed. The trigger and/or request for the timing advance can be received at some time t0 prior to t1, including during pre-transmission processing of a subframe N−n, where n represents an integer greater than or equal to 1. In LTE protocol, a timing advance trigger can be received six (6) subframes before the timing advance is performed by UE 100. During normal processing, i.e., without the timing advance, each subframe can takes up to a maximum amount of time, T, for the subframe's payload data to undergo pre-transmission processing for transmission on the uplink communication. This time T is generally represented by the normal size and duration arrow 320 running from the beginning to the end of each subframe. As utilized within the illustrative embodiments, T also correlates to a maximum physical size, i.e., amount of payload, of the subframe. In actual processing, the UE 100 is capable of processing each subframe in a time that is less than or equal to T. As further provided in the upper sequence 301, a first segment 325 of payload data of subframe N 310A is identified as a segment or portion that can be discarded in order to provide the timing advance. According to the descriptions which follow, the selected segment 325 corresponds and/or correlates to a measured time amount 327 of the normal duration 320 of full subframe N 310A, which time amount 327 is at least equivalent in the time domain to the amount of the timing advance ($T_{AD}$). This measured time amount 327 is generally illustrated as corresponding to the physical segment 325.

Lower sequence 302 then represents a second time, t2, at which reduced duration subframe N 310B has been truncated by an amount equal to the identified portion or segment 325 corresponding to the measured time amount 327, which is at least equal to the time advance being implemented. The truncation of the subframe N 310A generates reduced size and duration subframe N 310B, indicated by new size and duration arrow 330 relative to the normal size and duration arrow 320. As illustrated by FIG. 3, the resulting sequence (302) of three subframes is now shorter than the original sequence (301) of subframes by the value of the measured time amount 327 and by extension by at least the amount of the time advance ($T_{AD}$). FIG. 3 thus generally illustrates implementing a time advance at the subframe level, in which at least one subframe is truncated.

Figure 4:
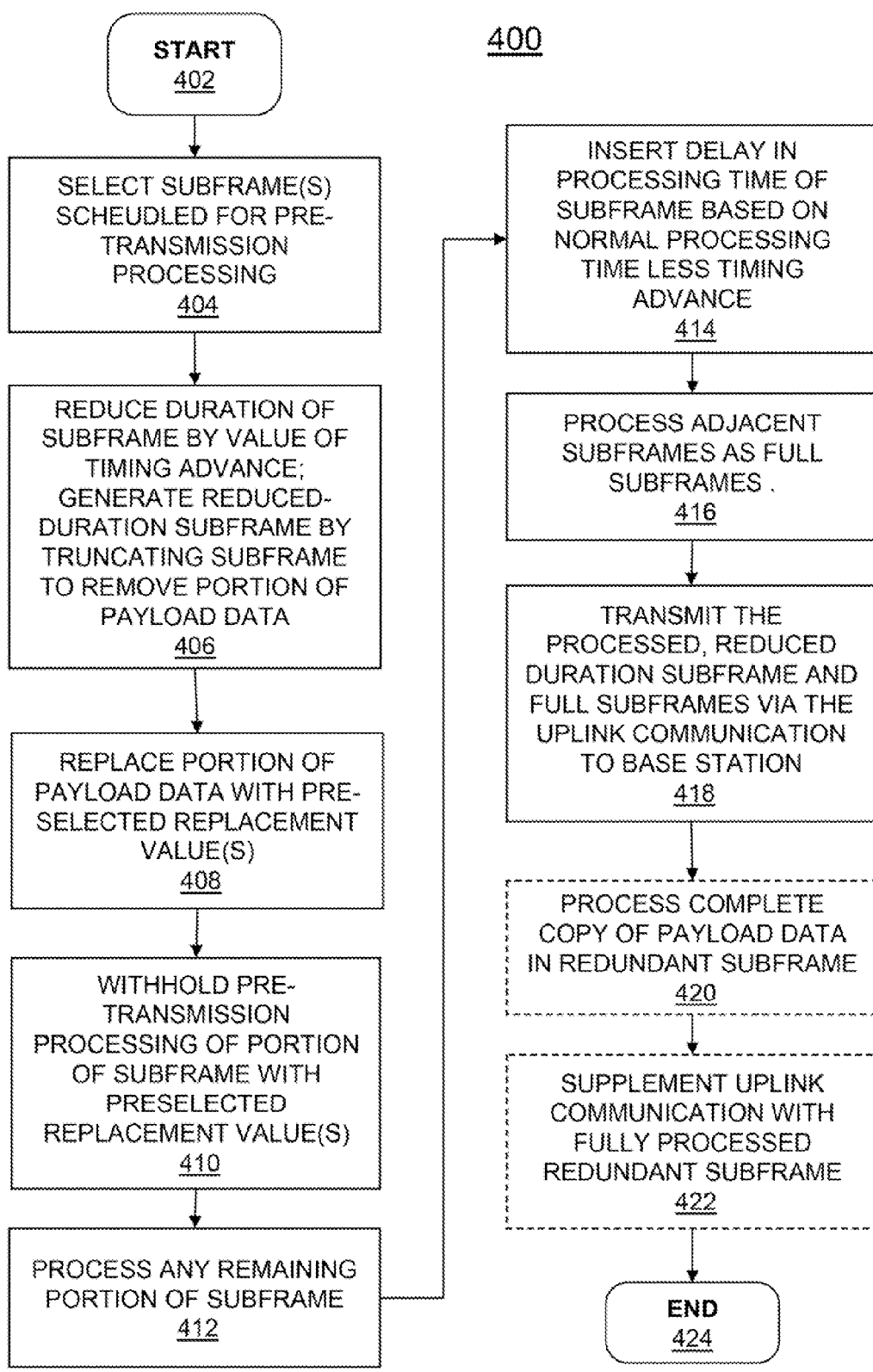
FIG. 4 is a flow chart illustrating the method for implementing a subframe level timing advance, according to one embodiment.

According to at least one embodiment, in pre-transmission processing, payload data within each subframe transmitted from the UE 100 to the base station (170) are processed by the SPU 137 prior to the subframe being transmitted via the uplink communication 137. During normal pre-transmission processing of the upper sequence 301 of subframes to generate resulting full subframes that are transmitted over the uplink communication 137, SPU 122 computes the entire payload within each of the subframes. Thus, pre-transmission processing of each equally sized subframe can take an equivalent amount of time as the subframes. According to one aspect of the disclosure, processing of the lower sequence 302 of subframes involves not only truncating the at least one normal subframe 310A to generate reduced size and duration subframe N 310B, but also performing several additional processes that result in a reduction of the overall pre-transmission processing time of the at least one subframe. The processing time of the lower sequence 302 is reduced by at least the measured time amount 327 and/or the amount of the timing advance. Thus, actual processing of the timing advance involves the SPU 122 performing additional functions at the subframe level, including those functions provided by the method illustrated by the flow chart of FIG. 4.

FIG. 4A is a flow chart illustrating the method for implementing a subframe level timing advance at a UE, such as UE 100 of FIGS. 1 and 2. The method 400 begins at block 402 and proceeds through blocks 404-416 at which the method 400 provides a sequence of functions comprising: selecting at least one subframe that is scheduled for pre-transmission processing (block 404); and reducing a duration of the at least one subframe by a value of the timing advance to generate at least one reduced duration subframe (block 406). According to one embodiment, reducing the physical size and duration of the at least one subframe comprises truncating the at least one subframe by removing at least one portion of the payload data of the subframe (block 406). The sequence of method functions then provides: replacing at least a portion of payload data in the at least one reduced duration subframe with a pre-selected replacement value (block 408); withholding pre-transmission processing of the portion of the subframe with the pre-selected replacement value; (block 410); performing pre-transmission processing of any remaining portion of the at least one subframe, where a processing time of the remaining portion of the at least one subframe is reduced by at least the value of the timing advance (block 412); and inserting a delay in the processing time of the subframe corresponding to a normal time for performing pre-transmission processing of the full subframe less the amount of the timing advance (block 414). With this last function, a processing time of the at least one reduced duration subframe is reduced by at least the value of the timing advance. Also, in one embodiment, incorporating the pre-selected replacement value within the at least one reduced duration subframe (block 410) triggers the base station (170) to apply one of a data-recovering algorithm and an error correction mechanism to recover payload data missing from the at least one subframe in response to receipt of the pre-selected replacement value. The sequence of method functions then provides: processing adjacent subframes to the at least one subframe as full subframes (block 416); and transmitting the adjacent subframes and the at least one reduced duration subframe via the uplink communication to the base station (block 418).

As a continuation of the method functions performed by the SPU 122, and as another aspect of the disclosure, the method can further provide for: processing a complete copy of the payload portion of each of the at least one subframe within corresponding redundant copies of the at least one subframe (block 420); and supplementing the uplink communication with the redundant copies of the at least one subframe as full subframes having a fully processed version of the complete payload portion of the at least one subframe (block 422). In one implementation, the corresponding redundant copies are generated to enable efficient data recovery from transmission errors that occur on the uplink communication. It is appreciated that both method functions presented by blocks 420 and 422 are optional and can be omitted in most embodiments. In yet another embodiment, the pre-selected replacement value comprises, in a time domain, at least one of a sequence of low energy samples or a sequence max energy samples. Further, in one embodiment, reducing a duration of the at least one subframe comprises discarding at least a portion of the payload data of at least one symbol within the at least one subframe. With this and other embodiments, any applicable default guard time of the wireless network that is factored into the timing advance equals at least the value of the timing advance. The method then ends at block 424.

While the above embodiments describe a method 400 by which the SPU 122 implements timing advance processing at the subframe level, additional embodiments are provided herein by which the time advance processing can be performed at a symbol level, within one or more subframes, rather than at the subframe level. With these additional embodiments, each of the at least one subframe comprises a plurality of symbols, which can each have a small segment of the payload data of the subframe. The allocation of segments of the overall subframe payload data to individual symbols can be completed via an allocation methodology specific to the protocol being utilized to generate the subframes. The above functions within the timing advanced processing of method 400 can then be applied to one or more reduced-duration symbols of at least one subframe. Thus, for example, replacing at least a portion of payload data comprises replacing a remaining portion of each of the at least one symbol with a pre-selected replacement value. Also, withholding pre-transmission processing of the at least a portion of the payload data with the pre-selected replacement value comprises skipping pre-transmission processing of each of the at least one symbol. Finally, processing any remaining portion of the at least one subframe comprises processing any remaining symbols of the at least one subframe that still contain payload data.

Notably, regardless of which level of processing is performed by the SPU 122, the resulting size and/or duration of the at least one subframe, and specifically the time required for performing the pre-transmission processing of the at least one subframe, is reduced in the time domain by at least the value of the timing advance. Thus, with the embodiments providing symbol level implementation of the timing advance, a combination of the reduced duration (i.e., the reduction in the amount of processing time required for the combination) of the at least one reduced-duration symbol equals to at least the value of the timing advance.

With the symbol level timing advance paradigm, processing the remaining symbols of the least one subframe includes computing a partial transmit orthogonal frequency division multiplexing (TX-OFDM) symbol for each of the remaining symbols of the at least one subframe. The processing of each of the other subframes that are not affected by a timing advance and thus have all of their symbols processed generates a full TX-OFDM symbol. According to one aspect of the disclosure, a time for generating the partial TX-OFDM symbol is at least the value of the timing advance less than a time for generating the full TX-OFDM symbol (i.e., $T_{partial} \leq T_{full} - T_{AD}$, where $T_{AD}$ is the timing advance).

Figure 5:
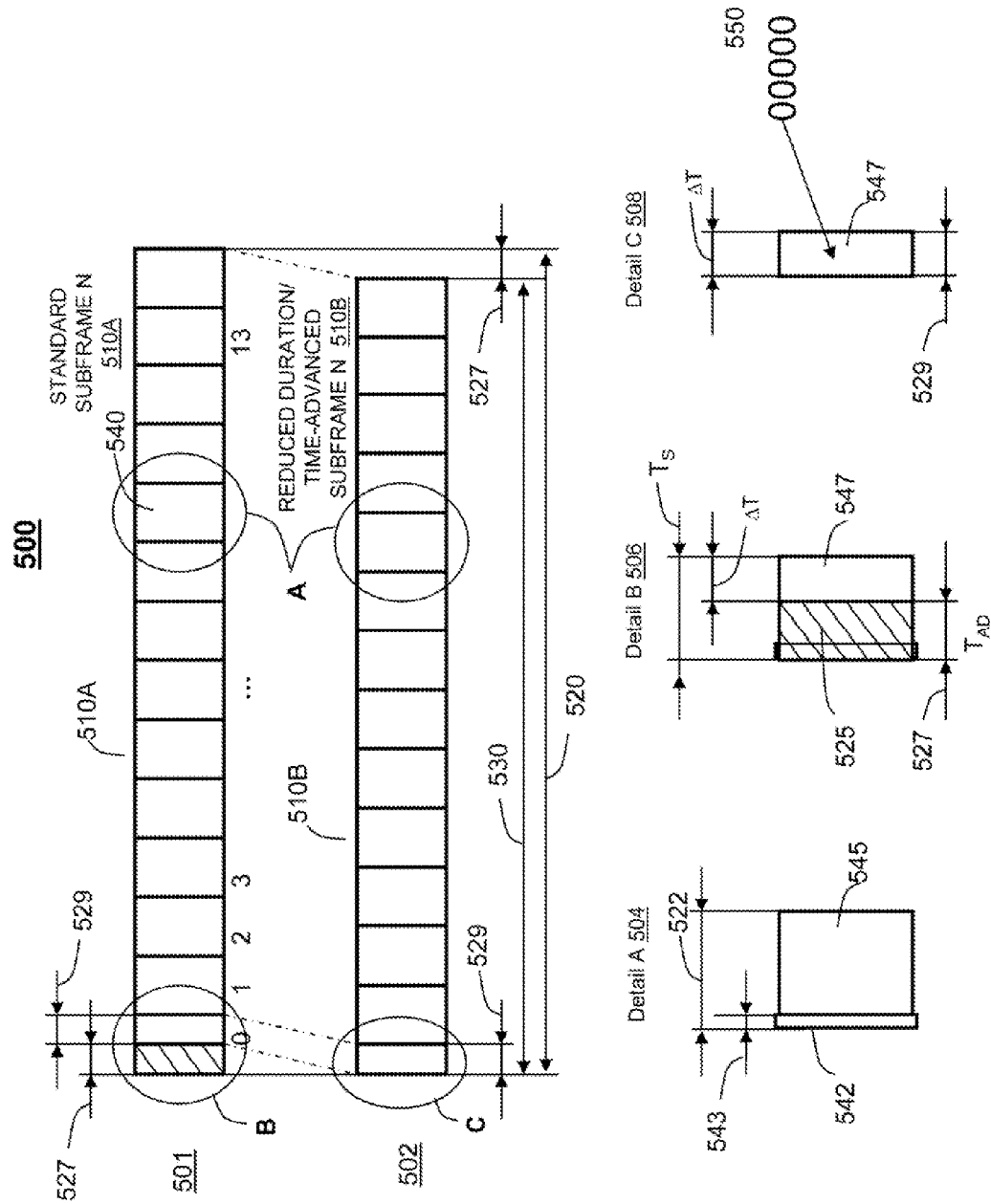
FIG. 5 illustrates a symbol level view of a transmission subframe being processed by the UE, with expanded views of the symbol affected by a timing advance, according to one embodiment.

FIG. 5 provides a diagrammatic representation of an example subframe 510, which can be subframe N 310 of FIG. 3, represented as a sequence of multiple individual symbols 545, according to one embodiment. Specifically, FIG. 5 presents an upper sequence 501 of symbols 540 of normal subframe 510A and a lower sequence 502 of symbols 540 of reduced duration subframe 510B or time advanced subframe. As shown, each version of subframe 510A, 510B has 14 total symbols, ranging from numbered symbol 0 through symbol 13. It is appreciated that the number of symbols transmitted within each subframe is a design characteristic of the particular communication protocol in which the subframes are utilized, and as such, the actual number of symbols can vary from one embodiment to the next. A standard physical dimension and/or time duration 520 of normal subframe 510A is illustrated below lower sequence 502 of symbols. As also shown by reduced physical dimension and/or time duration 530, an overall size and/or duration is reduced following truncation of at least the $0^{th}$ symbol to generate reduced-duration subframe 510B. The reduction in the time duration between the normal subframe 510A and the reduced duration subframe 510B is caused by a reduction in the size and the corresponding reduction in processing time of the $0^{th}$ symbol due to time advance 527.

FIG. 5 also presents exploded views of a zeroeth ($0^{th}$) and $9^{th}$ symbol of normal subframe 510A and an exploded view of the $0^{th}$ subframe of reduced duration subframe 510B. Normal subframe 510A represents the subframe 510 before a time advance operation, while reduced duration subframe 510B represents the subframe 510 after the time advanced operation on the $0^{th}$ symbol. Detail A 504 illustrates aspects of the sub-component makeup of an example normal symbol 540.

As shown, normal symbol 540 comprises two sections, a cyclic prefix 542 and payload data 545. Normal symbol 540 requires a full time duration 522 for processing, which includes processing time for payload duration ($T_s$) (Detail B 506), which for purposes of the described embodiments, includes the prefix time duration 543 of cyclic prefix 542.

During processing of a timing advance of time $T_{AD}$, SPU 122 identifies a corresponding portion of the $0^{th}$ symbol, which can be a portion of payload data 545 or a combination of cyclic prefix 542 and a portion of payload data 545, to be discarded from the $0^{th}$ symbol in order to perform the timing advance. For the remainder of the description, the cyclic prefix will be assumed to be just one component of the payload data, such that the timing advance discussion is independent of any differentiation between processing time of the cyclic prefix from the overall processing time of payload data of the full or reduced-duration symbol. Also, all ongoing discussion of a selection and removal of a portion of payload data assumes that payload data 545 can include the cyclic prefix. As illustrated by Detail B 504, a first portion 525 of payload data 545 is selected, corresponding to an amount of payload data that would be roughly equivalent to the timing advance ($T_{AD}$) 527 in the time domain. As further illustrated by Detail C 508, the remaining portion 547 of the original payload data 545 has its payload data replaced with a pre-selected replacement value 550, shown as a series of zeroes in the illustrative embodiment, with a measured time value 529 equal to a time delay component of $\Delta T$. It is appreciated that the pre-selected replacement values can be a different set of values and can, in one embodiment, not be actual logical values. For example, in one embodiment, the pre-selected replacement values are comprised of at least one of a sequence of low energy samples or a sequence of max energy samples, in a time domain. As further shown by FIG. 5, the remaining portion of the $0^{th}$ symbol has a measured time value 529 of $\Delta T$, corresponding to ($T_s - T_{AD}$). This measured time value 529 is utilized to insert a specific delay period in the transmission to account for the "processing time" of the remaining portion of the $0^{th}$ symbol. However, no actual processing occurs, relative to a normal symbol, as the $0^{th}$ symbol is simply transmitted with the replacement values inserted therein, without undergoing any pre-transmission processing.

Generally, with the symbol level implementation of timing advance, SPU 122 handles the problem of having to compute a full OFDM symbol in less time by simply not computing an OFDM symbol for the affected truncated symbol, $0^{th}$ symbol, and simply bypassing that processing by inserting a programmable delay into the processing time that would correspond to a partial time computation of an OFDM symbol. As described herein, at the symbol level, the programmable delay is assumed to be a delay of one symbol minus the desired timing advance. SPU 122 then begins performing pre-transmission processing from the 1st symbol, after skipping the $0^{th}$ symbol and waiting the programmable delay.

For alternate embodiments in which portions of multiple symbols have to be truncated in order to handle a much longer timing advance, the SPU 122 can skip and/or bypass the pre-transmission processing of multiple symbols within a single subframe or across multiple subframes. In Long Term Evolution (LTE) protocol, LTE TX processing requires an inverse Fast Fourier Transform (iFFT) operation per symbol. Outside of the present disclosure, reduction in samples transmitted on symbol 0 due to timing advance does not result in equivalent reduction in the processing requirement for that symbol and/or that subframe. UE 100 would thus be faced with having to process the same amount of symbols in less time. The described embodiments overcome this problem by not performing the iFFT processing of the symbols that are affected by the timing advance. However, by avoiding the processing altogether, more time than would be required for the timing advance is saved. The SPU 122 accommodates for this additional time by inserting a delay period corresponding to the additional time saved.

For example, in the LTE protocol, a maximum timing advance is typically 16.6 μs and symbol 0 ($0^{th}$ symbol) is typically 71.9 μs in duration for a normal cyclic prefix subframe and 83.3333 μs in duration for an extended cyclic prefix subframe (in the time domain). SPU 122 provides the timing advance by dropping at least 16.6 μs of one symbol from the at least one subframe and then inserting a delay ($\Delta T$) to accommodate the remainder of the symbol's normal iFFT processing time. As a specific example, in the LTE network environment, an eNB can request a directed maintenance timing advance of 10 μs. With the novel aspects introduced by the present disclosure, rather than requiring UE 100 to process 71.9 μs of computation for a normal subframe in 61.9 μs, SPU 122 transforms the symbol into a 61.9 μs of zero insertions. The $0^{th}$ symbol is then skipped altogether for iFFT processing. The SPU 122 can then process subsequent symbols at normal processing speed, having already accounted for the timing advance by by-passing the processing of the at least one symbol altogether and simply transmitting the unprocessed symbol with pre-selected replacement value following the time delay ($\Delta T$). Thus, UE 100 acquires the capability of performing LTE specification compliant maintenance timing advance without having or requiring duplicate hardware or a faster clock. The innovation thus also results in power saving and circuit area reduction.

As indicated by the above examples, one aspect of the disclosure is the extension of timing advance beyond that of the 5 μs time applicable to the cyclic portion of an LTE symbol, up to and including a timing delay of 16.6 μs. It is further appreciated that, with the embodiments presented herein, much larger timing advances are also possible. These can depend on the specific communication protocol being utilized by the UE 102 and/or within the wireless communication network (200) for uplink communication.

Figure 6:
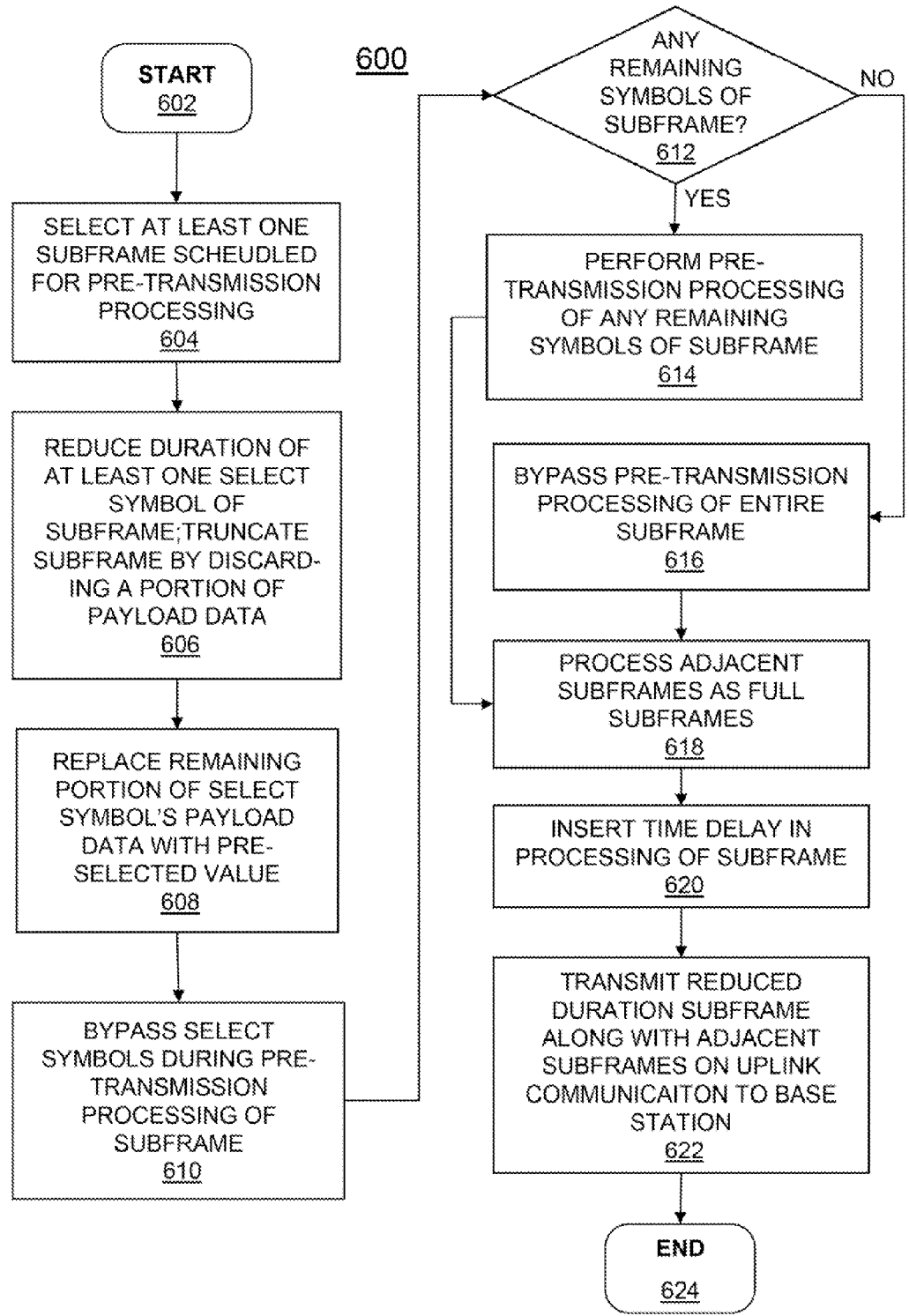
FIG. 6 is a flow chart illustrating the method for implementing symbol level processing for a timing advance, according to another embodiment.

With reference now to FIG. 6, and with continuing reference to FIGS. 1, 2 and 5, FIG. 6 provides a flow chart of the method for implementing timing advance in an example UE 100 with processing occurring at a symbol level. As a part of performing the timing advance processes, in pre-transmission processing, symbols within each subframe transmitted from the UE 100 to the base station (170) are processed (via DSP 122 for example) prior to being transmitted via the uplink communication 137.

Referring to the flow chart, method 600 begins at initiator block 602 and proceeds through blocks 604-612 in which the method 600 provides the functions of: selecting at least one subframe that is scheduled for pre-transmission processing (block 604); and reducing a duration of at least one selected symbol of each of the at least one subframe to generate at least one reduced duration subframe (block 606). In one embodiment, the reduced duration subframe is generated by truncating the at least one subframe by discarding at least a portion of the payload data of the at least one selected symbol (block 606). The method functions then includes: replacing a remaining portion of payload data of each of the at least one selected symbol with a pre-selected replacement value (block 608); by-passing each of the at least one selected symbol during pre-transmission processing of the at least one reduced duration subframe (block 610); and based on a determination that there are other symbols remaining in the subframe (block 612), performing pre-transmission processing of any remaining symbols of the at least one reduced duration subframe (block 614). According to the disclosure, the method includes: processing adjacent subframes to the at least one subframe as full subframes (block 618); inserting a delay in the processing time of the subframe corresponding to a normal time for performing pre-transmission processing of the full symbol less the amount of the timing advance (block 620); and transmitting the adjacent subframes along with at least one reduced duration subframe, including the unprocessed truncated symbol and the processed full symbols, via the uplink communication to the base station (block 622). Consequently, a processing time of the symbols of the at least one reduced duration subframe is reduced by at least the value of the timing advance.

With the above method, each of the at least one subframe comprises at least one symbol with payload data, and a combination of a reduction in the duration of each selected symbol of the at least one reduced duration subframe is substantially equal to a value of the timing advance. Finally, in one embodiment, when each symbol within a reduced duration subframe is a selected symbol, the processing unit replaces the entire subframe with a sequence of the pre-selected replacement value and bypasses pre-transmission processing of the entire subframe.

According to one embodiment, based on a negative response to the determination made at block 612, the method also provides: when each symbol within a reduced duration subframe is a selected symbol, the replacing a remaining portion of payload data comprises replacing the entire subframe with a sequence of the pre-selected replacement value and the method comprises bypassing pre-transmission processing of the entire subframe (block 616). Then, following the insertion of the time delay and transmission of the subframes on the uplink communication, the method 600 ends at block 624.

When the above functional aspects of the disclosure are described from the perspective of FIGS. 1 and 2, the disclosure generally provides a UE 100 that communicates within a wireless communication network 200, where UE 100 comprises: a transceiver 130; and a signal processing unit 122 coupled to the transceiver 130 and which, responsive to initiation of a timing advance during an uplink communication 137 of the UE 100 with a base station (170) of the network (200) implements the various functions of the above described method. Thus, the signal processing unit: selects at least one subframe that is scheduled for pre-transmission processing; reduces a duration of at least one selected symbol of each of the at least one subframe to generate at least one reduced duration subframe; replaces a remaining portion of payload data of each of the at least one selected symbol with a pre-selected replacement value; by-passes each of the at least one selected symbol during pre-transmission processing of the at least one reduced duration subframe; performing pre-transmission processes of any remaining symbols of the at least one subframe; and transmits the at least one reduced duration subframe via the uplink stream to the base station. In one embodiment, the SPU 122 also inserts a delay in the processing time of the subframe corresponding to a normal time for performing pre-transmission processing of the full symbol less the amount of the timing advance. Consequently, a processing time of the symbols of the at least one reduced duration subframe is reduced by at least the value of the timing advance.

In one embodiment, the signal processing unit 122 also: truncates the at least one subframe by discarding at least a portion of the payload data of the at least one selected symbol; processes adjacent subframes to the at least one subframe as full subframes; and transmits the adjacent subframes and the at least one reduced duration subframe within the uplink communication. Also, in one embodiment, the signal processing unit: processes a complete copy of the payload portion of each of the at least one subframe within corresponding redundant copies of the at least one subframe; and supplements the uplink communication with the redundant copies of the at least one subframe as full subframes having a processed version of the complete payload portion of each symbol of the at least one subframe. With this sequence of functions, the corresponding redundant copies are generated to enable efficient data recovery from transmission errors that occur on the uplink communication, and the incorporation of the pre-selected replacement value within the at least one reduced duration subframe triggers the base station to apply one of a data-recovering algorithm and an error correction mechanism to recover payload data missing from the at least one subframe in response to receiving a symbol with the pre-selected replacement value.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

In some implementations, certain processes of the methods are combined, performed simultaneously or in a different order, or perhaps omitted, without deviating from the spirit and scope of the invention. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of implementing a timing advance during an uplink communication between a user equipment (UE) and a base station of a wireless network, the method comprising:
   selecting at least one subframe that is scheduled for pre-transmission processing, wherein, in the pre-transmission processing, payload data within each subframe to be transmitted from the UE to the base station are processed prior to being transmitted via the uplink communication;
   reducing a duration of the at least one subframe by a value of the timing advance to generate at least one reduced duration subframe;
   replacing at least a portion of the payload data in the at least one reduced duration subframe with a pre-selected replacement value;
   withholding pre-transmission processing of the at least a portion of the payload data replaced with the pre-selected replacement value;
   performing pre-transmission processing of any remaining portion of the at least one subframe, wherein a processing time of the remaining portion of the at least one subframe is reduced by at least the value of the timing advance; and
   transmitting the at least one reduced duration subframe via the uplink communication to the base station.

2. The method of claim 1, wherein the at least one subframe comprises a plurality of symbols each having payload data, and wherein:
   reducing a duration of the at least one subframe comprises reducing, for each of the at least one subframe, a duration of at least one symbol of the plurality of symbols, wherein a combination of the reduced duration of each of the at least one symbol equals to the value of the timing advance;
   replacing at least a portion of payload data comprises replacing a remaining portion of each of the at least one symbol with a pre-selected replacement value;
   withholding pre-transmission processing of the at least a portion of the payload data with the pre-selected replacement value comprises skipping the pre-transmission processing of each of the at least one symbol; and
   processing any remaining portion of the at least one subframe comprises processing any remaining symbols of the at least one subframe that still contain payload data.

3. The method of claim 2, wherein:
   reducing a duration of the at least one subframe comprises discarding at least a portion of the payload data of at least one symbol within the at least one subframe, wherein any applicable default guard time of the wireless network that is factored into the timing advance equals at least the value of the timing advance; and
   the method further comprises replacing the remaining portion of the at least one symbol with the pre-selected replacement value.

4. The method of claim 2, wherein processing the remaining symbols of the least one subframe comprises computing a partial transmit orthogonal frequency division multiplexing (TX OFDM) symbol for each of the remaining symbols of the at least one subframe, wherein each subframe not affected by the timing advance and having all symbols processed generates a full TX-OFDM symbol, and wherein a time for generating the partial TX-OFDM symbol is at least the value of the timing advance less than a time for generating the full TX-OFDM symbol.

5. The method of claim 1, further comprising:
   processing adjacent subframes to the at least one subframe as full subframes; and
   transmitting the adjacent subframes and the at least one reduced duration subframe within the uplink communication.

6. The method of claim 1, wherein incorporating the pre-selected replacement value within the at least one reduced duration subframe triggers the base station to apply one of a data-recovering algorithm and an error correction mechanism to recover payload data missing from the at least one subframe.

7. The method of claim 1, wherein the pre-selected replacement value comprises, in a time domain, at least one of a sequence of low energy samples or a sequence max energy samples.

8. The method of claim 1, further comprising:
   processing a complete copy of the payload portion of each of the at least one subframe within corresponding redundant copies of the at least one subframe, wherein the corresponding redundant copies are generated to enable efficient data recovery from transmission errors that occur on the uplink communication; and supplementing the uplink communication with the redundant copies of the at least one subframe as full subframes having a processed version of the complete payload portion of the at least one subframe.

9. The method of claim 1, wherein reducing a duration of the at least one subframe comprises truncating the at least one subframe by removing at least one portion of the payload data of the at least one subframe.

10. A method for implementing a timing advance during an uplink communication between a user equipment (UE) and a base station of a wireless network, the method comprising:
    selecting at least one subframe that is scheduled for pre-transmission processing, wherein, in the pre-transmission processing, symbols within each subframe transmitted from the UE to the base station are processed prior to being transmitted via the uplink communication;
    reducing a duration of at least one selected symbol of each of the at least one subframe to generate at least one reduced duration subframe, wherein each of the at least one subframe comprises at least one symbol with payload data, and wherein a combination of a reduction in the duration of each selected symbol of the at least one reduced duration subframe is equal to or greater than a value of the timing advance;

replacing a remaining portion of the payload data of each of the at least one selected symbol with a pre-selected replacement value;

by-passing each of the at least one selected symbol during pre-transmission processing of the at least one reduced duration subframe;

performing pre-transmission processing of any remaining symbols of the at least one reduced duration subframe, wherein a processing time of the at least one reduced duration subframe is reduced by at least the value of the timing advance; and transmitting the at least one reduced duration subframe via the uplink communication to the base station.

11. The method of claim 10, wherein when each symbol within the at least one reduced duration subframe is a selected symbol, the replacing a remaining portion of payload data comprises replacing the entire subframe with a sequence of the pre-selected replacement value and the method comprises bypassing pre-transmission processing of the entire subframe.

12. The method of claim 10, further comprising:
truncating the at least one subframe by discarding at least a portion of the payload data of the at least one selected symbol;
processing adjacent subframes to the at least one subframe as full subframes; and
transmitting the adjacent subframes and the at least one reduced duration subframe within the uplink communication.

13. The method of claim 10, wherein the pre-selected replacement value comprises, in a time domain, at least one of a sequence of low energy samples or a sequence max energy samples.

14. The method of claim 10, wherein processing the remaining symbols of the least one subframe comprises computing a partial transmit orthogonal frequency division multiplexing (TX OFDM) symbol for each of the remaining symbols of the at least one subframe, wherein each subframe not affected by the timing advance and having all symbols processed generates a full TX-OFDM symbol, and wherein a time for generating the partial TX-OFDM is at least the value of the timing advance less than a time for generating the full TX-OFDM, and wherein the method further comprises inserting a delay in the pre-transmission processing time of the at least one subframe corresponding to a normal time for performing pre-transmission processing of the full symbol less the value of the timing advance.

15. The method of claim 10, further comprising:
processing a complete copy of the payload portion of each of the at least one subframe within corresponding redundant copies of the at least one subframe, wherein the corresponding redundant copies are generated to enable efficient data recovery from transmission errors that occur on the uplink communication; and
supplementing the uplink communication with the redundant copies of the at least one subframe as full subframes having a processed version of the complete payload portion of the at least one subframe;
wherein incorporating the pre-selected replacement value within the at least one reduced duration subframe triggers the base station to apply one of a data-recovering algorithm and an error correction mechanism to recover payload data missing from the at least one subframe.

16. A user equipment (UE) that communicates within a wireless communication network, the UE comprising:
a transceiver; and
a processing unit coupled to the transceiver and which, responsive to initiation of a timing advance during an uplink communication of the UE with a base station of the network, is to:
select at least one subframe that is scheduled for pre-transmission processing, wherein, in the pre-transmission processing, symbols within each subframe transmitted from the UE to the base station are processed prior to being transmitted via the uplink communication;
reduce a duration of at least one selected symbol of each of the at least one subframe to generate at least one reduced duration subframe, wherein each of the at least one subframe comprises at least one symbol with payload data, and wherein a combination of a reduction in the duration of each selected symbol of the at least one reduced duration subframe is equal to or greater than a value of the timing advance;
replace a remaining portion of the payload data of each of the at least one selected symbol with a pre-selected replacement value;
bypass each of the at least one selected symbol during pre-transmission processing of the at least one reduced duration subframe;
perform pre-transmission processing of any remaining symbols of the at least one subframe, wherein a processing time of the remaining symbols of the at least one reduced duration subframe is reduced by at least the value of the timing advance; and
transmit the at least one reduced duration subframe via the uplink communication to the base station;
wherein when each symbol within the at least one reduced duration subframe is a selected symbol, the processing unit is to replace the entire subframe with a sequence of the pre-selected replacement value and bypass pre-transmission processing of the entire subframe.

17. The UE of claim 16, wherein said the processing unit is to:
truncate the at least one subframe by discarding at least a portion of the payload data of the at least one selected symbol;
process adjacent subframes to the at least one subframe as full subframes; and
transmit the adjacent subframes and the at least one reduced duration subframe within the uplink communication.

18. The UE of claim 16, wherein the pre-selected replacement value comprises, in a time domain, at least one of a sequence of low energy samples or a sequence max energy samples.

19. The UE of claim 16, wherein the processing unit is to process the remaining symbols of the least one subframe by computation of a partial transmit orthogonal frequency division multiplexing (TX OFDM) symbol for each of the remaining symbols of the at least one subframe, wherein each subframe not affected by the timing advance and having all symbols processed is to generate a full TX-OFDM symbol, and wherein a time for generation of the partial TX-OFDM is at least the value of the timing advance less than a time for generation of the full TX-OFDM, and wherein the processing unit is to insert a delay in the pre-transmission processing time of the at least one subframe corresponding to a normal time for performing pre-transmission processing of the full symbol less the value of the timing advance.

20. The UE of claim 16, wherein the processing unit is to:
process a complete copy of the payload portion of each of the at least one subframe within corresponding redundant copies of the at least one subframe, wherein the corresponding redundant copies are to be generated to enable efficient data recovery from transmission errors that occur on the uplink communication; and
supplement the uplink communication with the redundant copies of the at least one subframe as full subframes having a processed version of the complete payload portion of the at least one subframe;
wherein incorporation the pre-selected replacement value within the at least one reduced duration subframe is to trigger the base station to apply one of a data-recovering algorithm and an error correction mechanism to recover payload data missing from the at least one subframe.

\* \* \* \* \*